US012769467B2

(12) United States Patent
Roweth et al.

(10) Patent No.: US 12,769,467 B2
(45) Date of Patent: *Oct. 20, 2026

(54) AGGREGATING SMALL REMOTE MEMORY ACCESS REQUESTS

(71) Applicant: Hewlett Packard Enterprise Development LP, Spring, TX (US)

(72) Inventors: Duncan Roweth, Bristol (GB); Robert L. Alverson, Seattle, WA (US); Nathan L. Wichmann, Bloomington, MN (US); Eric P. Lundberg, Eau Claire, WI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/218,852

(22) Filed: May 27, 2025

(65) Prior Publication Data

US 2025/0284415 A1 Sep. 11, 2025

Related U.S. Application Data

(63) Continuation of application No. 17/976,728, filed on Oct. 28, 2022, now Pat. No. 12,321,619.

(51) Int. Cl.
*G06F 3/06* (2006.01)

(52) U.S. Cl.
CPC .......... *G06F 3/0625* (2013.01); *G06F 3/0659* (2013.01); *G06F 3/067* (2013.01)

(58) Field of Classification Search
CPC ....... G06F 3/0625; G06F 3/0659; G06F 3/067
See application file for complete search history.

(56) References Cited

U.S. PATENT DOCUMENTS

2004/0120336 A1* 6/2004 Hendel .................. H04L 47/39 370/412
2007/0005913 A1 1/2007 Muthrasanallur et al.
(Continued)

FOREIGN PATENT DOCUMENTS

CN 108536543 A 9/2018
CN 108694087 A 10/2018
(Continued)

OTHER PUBLICATIONS

Kaufmann, Antoine, et al. "High performance packet processing with flexnic." Proceedings of the Twenty-First International Conference on Architectural Support for Programming Languages and Operating Systems. 2016. (Year: 2016).*

*Primary Examiner* — Nicholas J Simonetti
(74) *Attorney, Agent, or Firm* — Yao Legal Services, Inc.

(57) ABSTRACT

A network interface card (NIC) receives a stream of commands, a respective command comprising memory-operation requests, each request associated with a destination NIC. The NIC buffers asynchronously the requests into queues based on the destination NIC, each queue specific to a corresponding destination NIC. When first queue requests reach a threshold, the NIC aggregates the first queue requests into a first packet and sends the first packet to the destination NIC. The NIC receives a plurality of packets, a second packet comprising memory-operation requests, each request associated with a same destination NIC and a destination core. The NIC buffers asynchronously the requests of the second packet into queues based on the destination core, each queue specific to a corresponding destination core. When second queue requests reach the threshold, the NIC aggregates the second queue requests into a third packet and sends the third packet to the destination core.

20 Claims, 9 Drawing Sheets

(56) References Cited

U.S. PATENT DOCUMENTS

| | | | |
|---|---|---|---|
| 2017/0093699 | A1 | 3/2017 | Crupnicoff et al. |
| 2018/0267919 | A1 | 9/2018 | Burstein |
| 2018/0285151 | A1 | 10/2018 | Wang et al. |
| 2018/0322913 | A1 * | 11/2018 | Friedman .............. G06F 12/063 |
| 2021/0014177 | A1 | 1/2021 | Kasichainula |

FOREIGN PATENT DOCUMENTS

| | | | |
|---|---|---|---|
| CN | 112231250 | A | 1/2021 |
| CN | 114285510 | A | 4/2022 |
| WO | 2021/002979 | A1 | 1/2021 |

* cited by examiner

AGGREGATING SMALL REMOTE MEMORY ACCESS REQUESTS

CROSS REFERENCE TO RELATED APPLICATIONS

This application is a continuation of U.S. patent application Ser. No. 17/976,728, filed on Oct. 28, 2022. The disclosure of the aforementioned application is hereby incorporated by reference in its entirety.

BACKGROUND

Field

Current supercomputer performance may require a large number of small remote memory operations, where each operation may carry a certain network packet overhead. As link bandwidths increase, sustaining the line rate on such small packets can become more difficult and expensive. Systems which are based on commodity technologies may be under-achieving, while systems which are based on proprietary technologies may be too expensive.

BRIEF DESCRIPTION OF THE FIGURES

In the figures, like reference numerals refer to the same figure elements.

DETAILED DESCRIPTION

Figure 1:
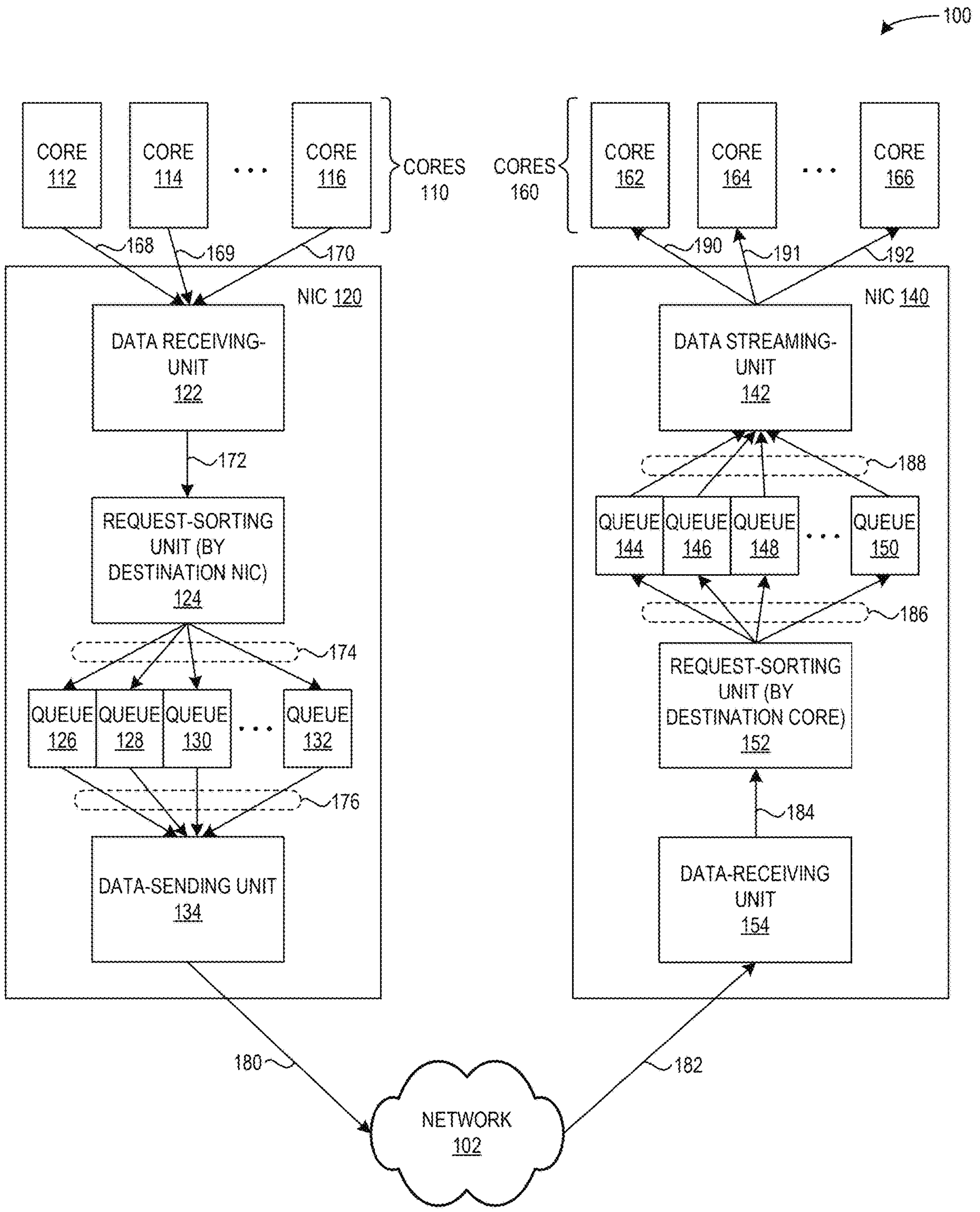
FIG. 1 illustrates a diagram of an architecture which facilitates aggregating remote memory-operation requests, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Current supercomputer performance may require a large number of small remote memory operations, where each operation may carry a certain network packet overhead. As link bandwidths increase, sustaining the line rate on such small packets can become more difficult and expensive. Systems which are based on commodity technologies may be under-achieving, while systems which are based on proprietary technologies may be too expensive. Furthermore, current solutions to provide efficient performance for small remote memory operations may involve aggregation of requests by software. However, aggregation of requests by software may consume large amounts of memory and central processing unit (CPU) time, which can lead to an inefficient use of those resources.

The described aspects of the present application address these challenges by providing a system which aggregates many small remote memory-operation requests into larger messages (e.g., a NIC command), where NICs (or NIC application-specific integrated circuits (ASICs)) can buffer the requests and process them asynchronously in order to service the requests in efficient batches. Instead of sending requests individually from a host to a source NIC, the requests can be streamed from the host to the source NIC. The source NIC can perform a first sort or a first asynchronous buffering (i.e., "buffered async" or "BA"), by placing each request into a source-side queue corresponding to a destination NIC indicated in the request. When a given source-side queue is full, the source NIC can send the data in the full queue as a packet to the destination NIC. The destination NIC can receive the packet and perform a second sort or a second asynchronous buffering by placing each request into a destination-side queue corresponding to a destination core indicated in the request. When a given destination-side queue is full, the destination NIC can send (i.e., stream) the data in the full queue as a packet to the destination core.

Thus, the described aspects can separate the process of sorting requests from the payload data carried by the requests, which can result in freeing up the software to provide the necessary resources based on the requirements of a given application. An exemplary high-level architecture with a source NIC and a destination NIC is described below in relation to FIG. 1, while detailed diagrams of a source (sending) NIC and a destination (receiving) NIC are described below in relation to, respectively, FIGS. 3 and 4.

Figure 3:
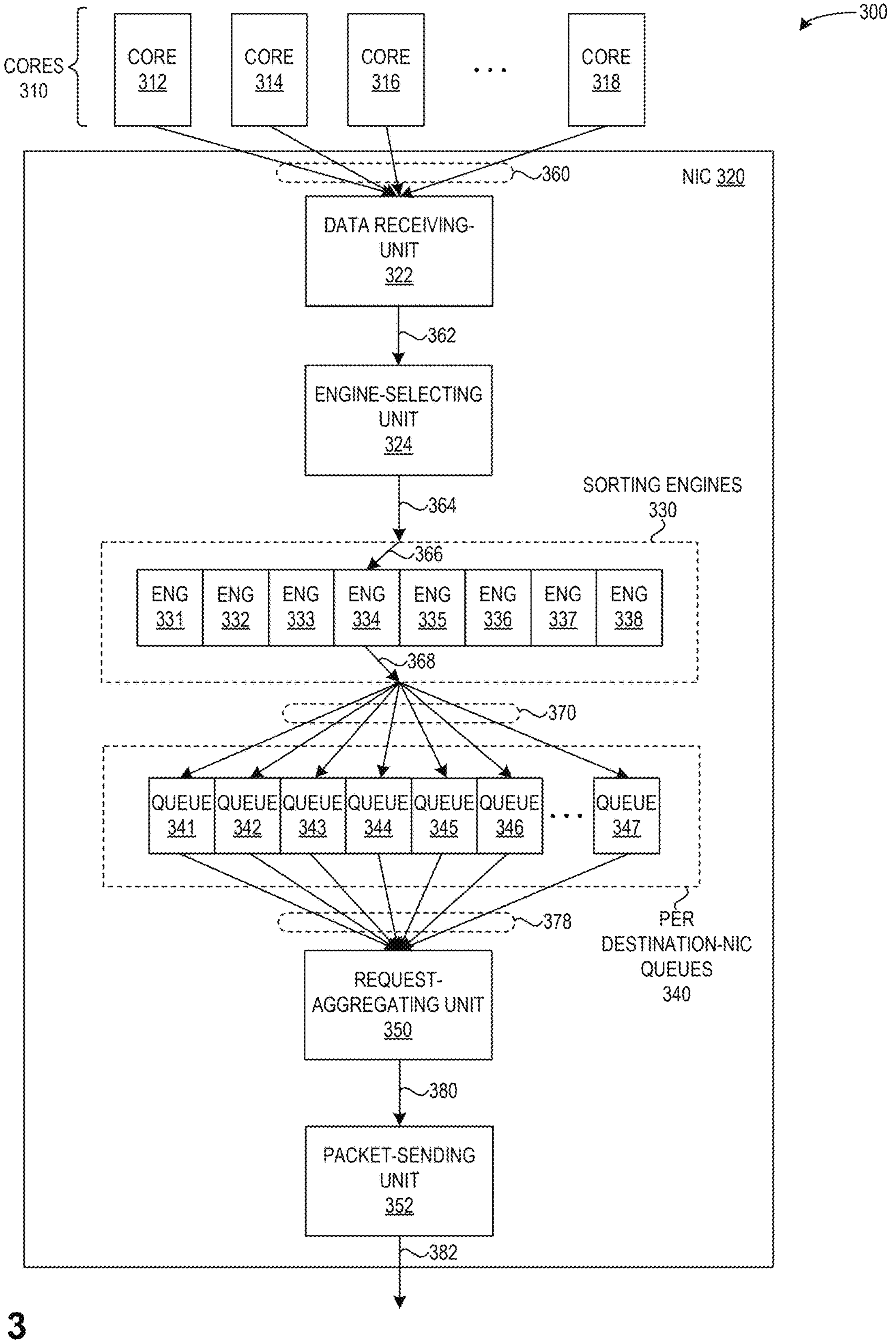
FIG. 3 illustrates a diagram of a source NIC, including a first sort or asynchronous buffering of memory-operation requests based on a destination NIC, in accordance with an aspect of the present application.
Figure 4:
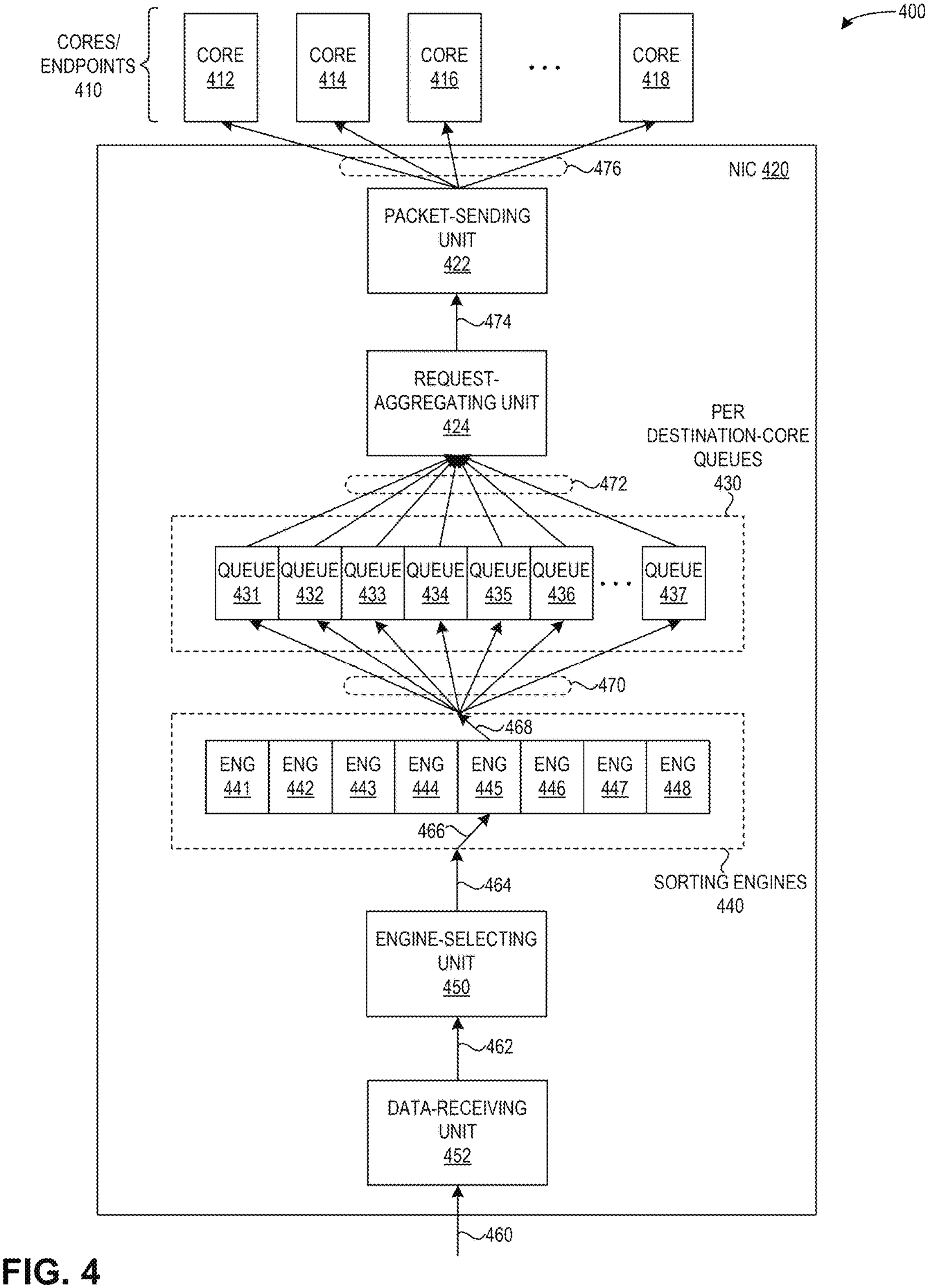
FIG. 4 illustrates a diagram of a destination NIC, including a second sort or asynchronous buffering of memory-operation requests based on a destination core, in accordance with an aspect of the present application.

The terms "buffering asynchronously," "buffered async," and "BA" are used interchangeably in this disclosure and refer to the operations described herein, in which requests are sorted or buffered into queues based on destination information, e.g.: based on the destination NIC in a first sort, as in request-sorting unit 124 and sorting engines 330 of, respectively, FIGS. 1 and 3); or based on the destination core in a second sort, as in request-sorting unit 152 and sorting engines 440 of, respectively, FIGS. 1 and 4). These requests are subsequently aggregated, e.g.: when based on the destination NIC, by data-sending unit 134 of FIG. 1 and request-aggregating unit 350 and packet-sending unit 352 of FIG. 3; and when based on the destination core, by data-streaming unit 142 of FIG. 1 and request-aggregating unit 424 and packet-sending unit 422 of FIG. 4.

The terms "endpoint" and "core" are used interchangeably in this disclosure and refer to one of a plurality endpoints or cores of a host associated with a given NIC.

The terms "memory-operation request," "remote memory access request," and "remote memory operation" are used interchangeably in this disclosure and refer to a request to access or perform an operation on a memory of a host. In this disclosure, these types of requests are generally small in size. For example, 10-15 of these requests may fit into a single NIC command of 256 bytes. An exemplary NIC command with multiple memory-operation requests is depicted below in relation to FIG. 2.

Exemplary High-Level Architecture

FIG. 1 illustrates a diagram 100 of an architecture which facilitates aggregating remote memory-operation requests, in accordance with an aspect of the present application. Diagram 100 can include; a host with cores 110 (including, e.g., cores 112, 114, and 116); a NIC 120; a host with cores 160 (including, e.g., cores 162, 164, and 166); and a NIC 140. In an exemplary data path, NIC 120 (e.g., a source NIC) can send data to NIC 140 (e.g., destination NIC) over a network 102 (e.g., a high-bandwidth network). NIC 120 can include: a data-receiving unit 122; a request-sorting unit 124; a first plurality of queues 126, 128, 130, and 132; and a data-sending unit 134. NIC 140 can include: a data-receiving unit 154; a request-sorting unit 152; a second plurality of queues 144, 146, 148, and 150); and a data-streaming unit 142.

Queues 126-132 in the first plurality of queues in source NIC 120 can each be specific to a destination NIC. In some aspects, the number of queues in the first plurality of queues can be 4096, e.g., NIC 120 can communicate with up to 4096 other NICs. Queues 144-150 in the second plurality of queues in destination NIC 140 can each be specific to a destination core or endpoint. In some aspects, the number of queues in the second plurality of queues can be 256, e.g., NIC 140 can be associated with a host which has 256 cores or endpoints. The number of queues in the first plurality of queues of source NIC 120 and in the second plurality of queues of destination NIC 140 can be greater than or less than these exemplary values and can be based on various factors, e.g., specific application or customer needs, future changes to processor architecture or design, and variations in bandwidth.

Furthermore, based on current system designs, an exemplary size for each queue of both the first and second plurality of queues can be 256 bytes (not related to the number of actual queues of the destination NIC 140 corresponding to cores). As with the number of queues of both the first and second plurality of queues, the size of each queue (i.e., the depth of the queue) can be greater or less than this exemplary value and also based on various factors, as described above.

During operation, NIC 120, by data-receiving unit 122, can receive data from one of cores 110 (via, e.g., communications 168, 169, and 170). Instead of a core sending data and the NIC receiving data as many individual small messages or requests, the core can stream data as NIC commands to data-receiving unit 122. These streamed NIC commands can indicate that the payload is to be buffered and subsequently processed asynchronously (using the buffer async or BA method described here). A respective NIC command can further include a plurality of small remote memory-operation requests, each with a header and a payload. Each request can indicate a destination NIC and a destination endpoint or core. An exemplary NIC command is described below in relation to FIG. 2. Data-receiving unit 122 can transmit a received NIC command to request-sorting unit 124 (via a communication 172). Request-sorting unit 124 can process the plurality of requests in the NIC command by asynchronously buffering the requests into a first plurality of queues (e.g., 126-132) based on the destination NIC associated with or indicated in each request (via communications 174). When a total size of the requests stored in a given queue reaches a predetermined threshold (e.g., 256 bytes), those requests can be aggregated into a first packet (via communications 176) and data-sending unit 134 can send the first packet to the indicated destination NIC (via a communication 180 over network 102).

NIC 140, by data-receiving unit 154, can receive a plurality of packets, including the first packet comprising the requests previously aggregated and stored in the given queue of NIC 120. Recall that each request can indicate a destination NIC and a destination endpoint or core. Continuing with the example of the first packet received by data-receiving unit 154, each of the requests in the first packet can indicate the same destination NIC and a destination endpoint or core associated with NIC 140. Data-receiving unit 154 can transmit the received first packet to request-sorting unit 152 (via a communication 184). Request-sorting unit 152 can process the plurality of requests in the first packet by asynchronously buffering the requests into a second plurality of queues (e.g., 144-150) based on the destination endpoint or core associated with or indicated in each request (via communications 186). When a total size of the requests stored in a given queue reaches a predetermined threshold (e.g., 256 bytes), those requests can be aggregated into a packet (via communications 188) and data-streaming unit 142 can send the packet to the indicated destination core (via, e.g., communications 190, 191, and 192). Data-streaming unit 142 can thus stream packets destined for each specific core, where each packet is the size of the queue (e.g., 256 bytes) and contains many smaller remote memory-operation requests.

Thus, diagram 100 illustrates how the described aspects can reduce the overhead associated with transmitting a large number of memory-operation requests over a high-bandwidth network, by aggregating the requests into queues using a first sort on the source side (based on the destination NIC) and further using a second sort on the destination side (based on the destination core).

Exemplary Format of a NIC Command for Buffered Async

Figure 2:
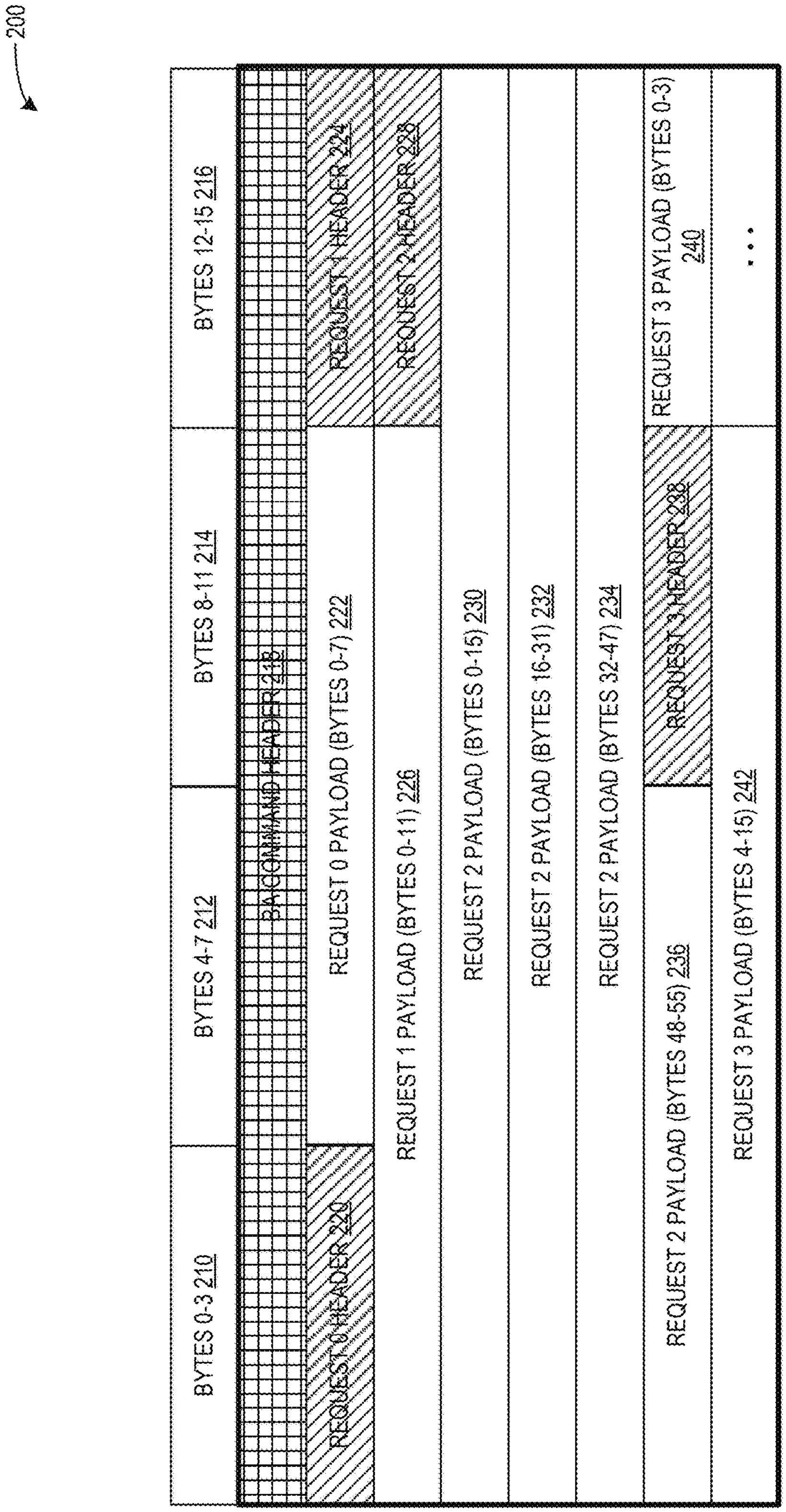
FIG. 2 illustrates an exemplary format of a NIC command including a header and multiple memory-operation requests, in accordance with an aspect of the present application.

FIG. 2 illustrates an exemplary format of a NIC command 200 including a header and multiple memory-operation requests, in accordance with an aspect of the present application. NIC command 200 can be indicated by four-byte segments (e.g., a bytes 0-3 210 segment, a bytes 4-7 212 segment, a bytes 8-11 214 segment, and a bytes 12-15 216 segment). NIC command 200 can include as its first 16 bytes a BA command header 218 (indicated by a perpendicular cross-hatch fill pattern), which can indicate a length of its payload and that the payload comprises memory-operation requests which are to be buffered and aggregated asynchronously. For example, the length of the subsequent payload of command 200 can be 108 bytes.

The memory-operation requests in the payload of NIC command 200 can each comprise a 4-byte header (indicated by a right-slanting fill pattern) and the corresponding payload. The 4-byte header can indicate at least the following: the destination NIC for the request; the destination core for the request; and a size or length of the payload. For example, a request 0 header 220 can indicate a destination NIC, a destination core, and a payload length of 8, while request 0 payload (bytes 0-7) 222 can follow. Subsequent requests can include a similar format: a request 1 header 224 can indicate its destination NIC, its destination core, and a payload length of 12 bytes, followed by a request 1 payload (bytes 0-11) 226; a request 2 header 228 can indicate its destination NIC, its destination core, and a payload length of 56 bytes, followed by a request 2 payload (bytes 0-15) 230, a request 2 payload (bytes 16-31) 232, a request 2 payload (bytes 32-47) 234, and a request 2 payload (bytes 48-55) 236; and a request 3 header 238 can indicate its destination NIC, its destination core, and a payload length of 16 bytes, followed by a request 3 payload (bytes 0-3) 240 and a request 3 payload (bytes 4-15) 242.

While NIC command 200 depicts only 16 bytes of BA command header 218 and 108 bytes of subsequent payload (for requests 0, 1, 2, and 3) for a total of 124 bytes, NIC command 200 can include data up to any predetermined value, e.g., 256 bytes. Memory-operation requests cannot be split across (i.e., do not cross) NIC command boundaries.

Detailed Description of Source/Sending NIC

FIG. 3 illustrates a diagram 300 of a source NIC 320, including a first sort or asynchronous buffering of memory-operation requests based on a destination NIC, in accordance with an aspect of the present application. NIC 320 can receive data from cores 310 (e.g., one of cores 312, 314, 316, and 318 via communications 360). NIC 320 can include: a data-receiving unit 322; an engine-selecting unit 324; a plurality of sorting engines 330 (e.g., eight engines 331, 332, 333, 334, 335, 336, 337, and 338); a plurality of per destination-NIC queues 340 (e.g., queues 341, 342, 343, 344, 345, 346, and 347); a request-aggregating unit 350; and a packet-sending unit 352.

As described above in relation to FIG. 1, the cores can stream data as NIC commands to data-receiving unit 322. These streamed NIC commands can indicate that the payload is to be buffered and subsequently processed asynchronously (using the buffer async or BA method described here). Each NIC command can further include a plurality of small remote memory-operation requests, each with a header and a payload, as described above in relation to FIG. 2. Each request (in its header) can indicate a destination NIC and a destination endpoint or core.

Data-receiving unit 322 can transmit a received NIC command to engine-selecting unit 324 (via a communication 362). Engine-selecting unit 324 can select, based on a load-balancing strategy, a first engine of a first plurality of engines (i.e., sorting engines 330) and transmit a given NIC command to the selected engine (via a communication 364). Each of the sorting engines can process a certain amount of data per clock cycle, e.g., 16 bytes per clock cycle. As a result, given a plurality (e.g., 8) of sorting engines, sorting engines 330 can buffer and process approximately 16*8=128 total bytes per clock cycle. A single NIC command will be processed entirely by the selected engine. That is, the NIC command will not be split further into smaller pieces for processing. Each sorting engine can process the requests in a given NIC command (e.g., at a rate of 16 bytes per clock cycle) and place the requests into the appropriate per-destination-NIC queue (of queues 340).

For example, engine-selecting unit 324 may determine to send the given NIC command to sorting engine 334 (via a communication 366). Sorting engine 334 can process the 256 bytes of the given NIC command by buffering each memory-operation request into the correct per destination-NIC queue (e.g., into queues 341-347 via communications 368 and 370).

When a total size of the requests stored in a given queue of queues 340 reaches a predetermined threshold (e.g., 256 bytes), those requests can be aggregated into a first packet by request-aggregating unit 350 (via communications 378). Request-aggregating unit 350 can send the first packet to packet-sending unit 352 (via a communication 380), and packet-sending unit 352 can send the first packet to the indicated destination NIC (via a communication 382 over a network (not shown)).

Detailed Description of Destination/Receiving NIC

FIG. 4 illustrates a diagram 400 of a destination NIC 420, including a second sort or asynchronous buffering of memory-operation requests based on a destination core, in accordance with an aspect of the present application. NIC 420 can include: a data-receiving unit 452; an engine-selecting unit 450; a plurality of sorting engines 440 (e.g., eight engines 441, 442, 443, 444, 445, 446, 447, and 448); a plurality of per destination-core queues 430 (e.g., queues 431, 432, 433, 434, 4345, 436, and 437); a request-aggregating unit 424; and a packet-sending unit 422. NIC 420 can stream data packets to cores/endpoints 410 (e.g., one of cores 412, 414, 416, and 418 via communications 476).

NIC 420 can receive data from a source NIC (via a communication 460 over a network (not shown)). The data can include packets which comprise a plurality of small remote memory-operation requests, each with a header and a payload, as described above in relation to FIG. 2. Each request (in its header) can indicate a destination NIC and a destination endpoint or core. Packets received by destination NIC 420 can indicate the same destination NIC (i.e., NIC 420) and a destination core (i.e., one of cores 410). Data-receiving unit 452 can transmit a received packet to engine-selecting unit 450 (via a communication 462). Engine-selecting unit 450 can select, based on a load-balancing strategy, a second engine of a second plurality of engines (i.e., sorting engines 440) and transmit a given packet to the selected engine (via a communication 464). Similar to sorting engines 330 depicted in FIG. 3 in source NIC 320, each of the sorting engines 440 can process a certain amount of data per clock cycle, e.g., 16 bytes per clock cycle. As a result, given a plurality (e.g., 8) of sorting engines, sorting engines 330 can buffer and process approximately 16*8=128 total bytes per clock cycle. A single packet will be processed entirely by the selected engine. That is, the packet will not be split further into smaller pieces for processing. Each sorting engine can process the requests in a given packet (e.g., at a rate of 16 bytes per clock cycle) and place the requests into the appropriate per destination-core queue (of queues 430).

For example, engine-selecting unit 450 may determine to send the given packet to sorting engine 445 (via a communication 466). Sorting engine 445 can process the (up to) 256 bytes of the given packet by buffering each memory-operation request into the correct per destination-core queue (e.g., into queues 431-437 via communications 468 and 470).

When a total size of the requests stored in a given queue of queues 430 reaches a predetermined threshold (e.g., 256 bytes), those requests can be aggregated into a second packet by request-aggregating unit 424 (via communications 472). Request-aggregating unit 424 can send the second packet to packet-sending unit 422 (via a communication 474), and packet-sending unit 422 can send the second packet to the indicated destination core (via communications 476). Packet-sending unit 422 can be a data-streaming unit, i.e., stream multiple packets destined to the various cores of destination NIC 420.

Method for Facilitating Aggregation of Remote Memory-Operation Requests

Figure 5A:
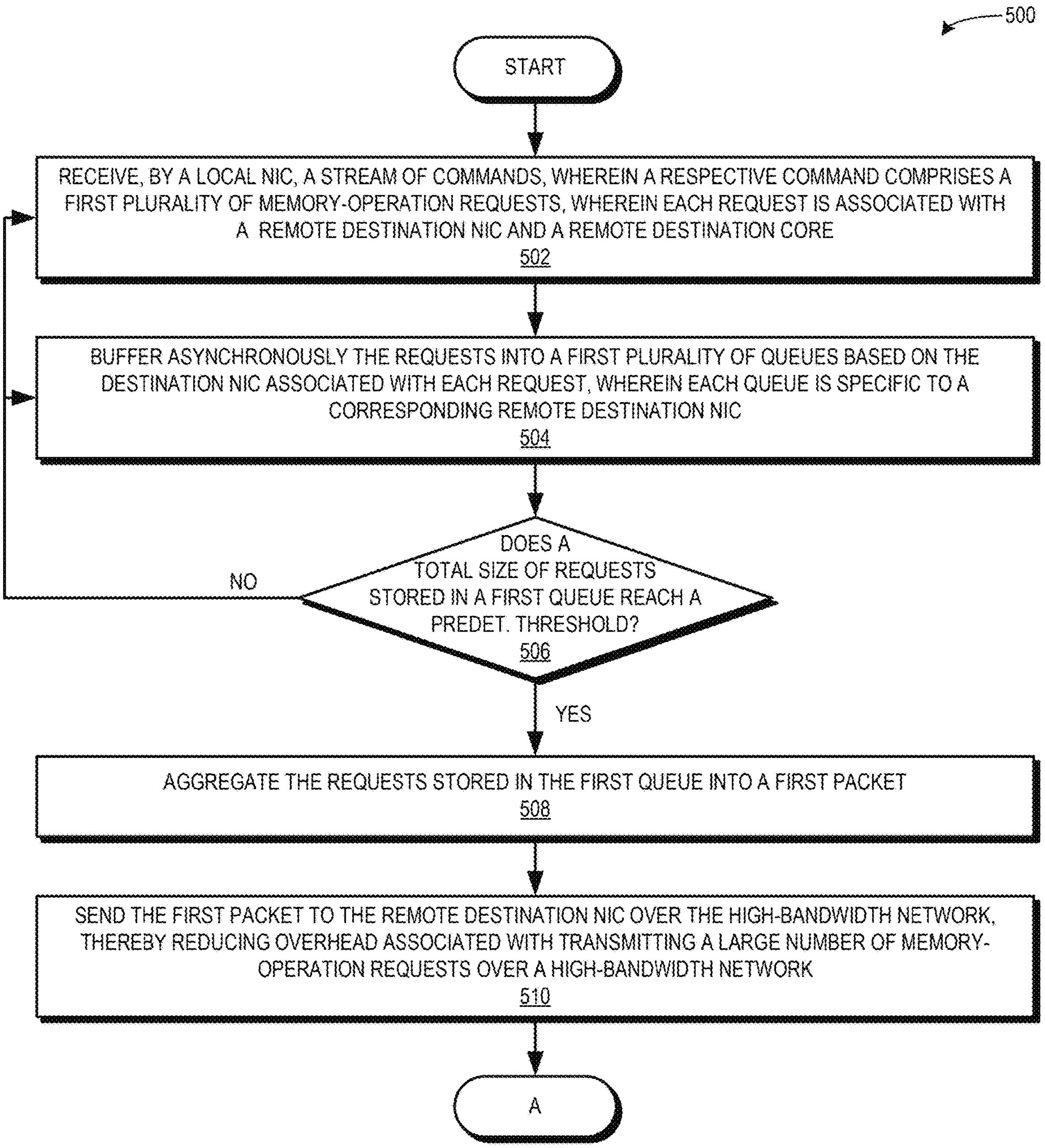
FIG. 5A presents a flowchart illustrating a method which facilitates aggregating remote memory-operation requests, including send operations by a single NIC, in accordance with an aspect of the present application.

The described aspects can include a single NIC which performs both source (send) operations and destination (receive) operations, as depicted below in relation to FIGS. 5A and 5B. FIG. 5A presents a flowchart 500 illustrating a method which facilitates aggregating remote memory-operation requests, including send operations by a single NIC, in accordance with an aspect of the present application. During operation, the system receives, by a local network interface card (NIC), a stream of commands, wherein a respective command comprises a first plurality of memory-operation requests, wherein each request is associated with a remote destination NIC and a remote destination core (operation 502). The stream of commands is received by the local NIC as a stream rather than as individual memory-operation requests. The local NIC can retrieve data in contiguous arrays of memory-operation requests comprising payload and corresponding destination information (destination NIC and destination core) over, e.g., a Peripheral Component Interconnect Express (PCIe) connection, a Compute Express Link (CXL), or other host interface or on-chip network. The system buffers asynchronously the requests into a first plurality of queues based on the destination NIC associated with each request, wherein each queue is specific to a corresponding remote destination NIC (operation 504). If a total size of requests stored in a first queue does not reach a predetermined threshold (decision 506), the system can continue at operation 502 or 504.

If a total size of requests stored in a first queue does reach a predetermined threshold (decision 506), the system aggregates the requests stored in the first queue into a first packet (operation 508) and sends the first packet to the remote destination NIC over a high-bandwidth network, thereby reducing overhead associated with transmitting a large number of memory-operation requests over the high-bandwidth network (operation 510). The operation continues at Label A of FIG. 5B.

Figure 5B:
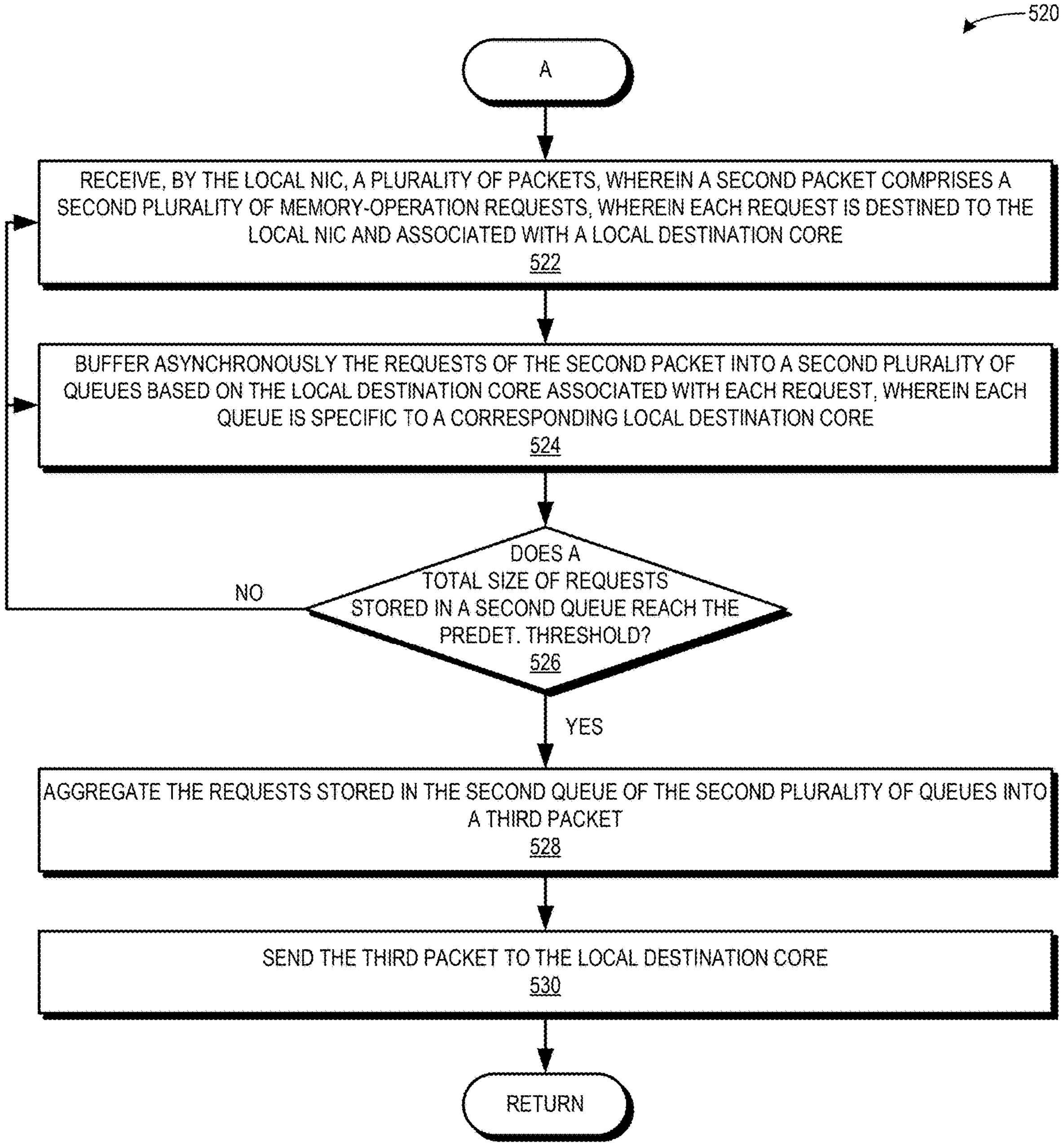
FIG. 5B presents a flowchart illustrating a method which facilitates aggregating remote memory-operation requests, including receive operations by the single NIC of FIG. 5A, in accordance with an aspect of the present application.

FIG. 5B presents a flowchart 520 illustrating a method which facilitates aggregating remote memory-operation requests, including receive operations by the single NIC of FIG. 5A, in accordance with an aspect of the present application. The system receives, by the local NIC, a plurality of packets, wherein a second packet comprises a second plurality of memory-operation requests, wherein each request is destined to the local NIC and associated with a local destination core (operation 522). The system buffers asynchronously the requests of the second packet into a second plurality of queues based on the destination core associated with each request, wherein each queue is specific to a corresponding local destination core (operation 524). If a total size of the requests stored in a second queue of the second plurality of queues does not reach the predetermined threshold (decision 526), the system can continue at operation 522 or 524.

If a total size of the requests stored in a second queue of the second plurality of queues does reach the predetermined threshold (decision 526), the system aggregates the requests stored in the second queue into a third packet (decision 528) and sends the third packet to the local destination core, thereby further reducing the overhead associated with transmitting a large number of memory-operation requests over the high-bandwidth network (operation 530). The system, by the local NIC, can determine that a total size of aggregated requests stored in one or more queues of the second plurality of queues reaches the predetermined threshold and can further stream those aggregated requests to a respective corresponding local destination core specific to a respective queue (not shown). The operation returns.

Figure 6A:
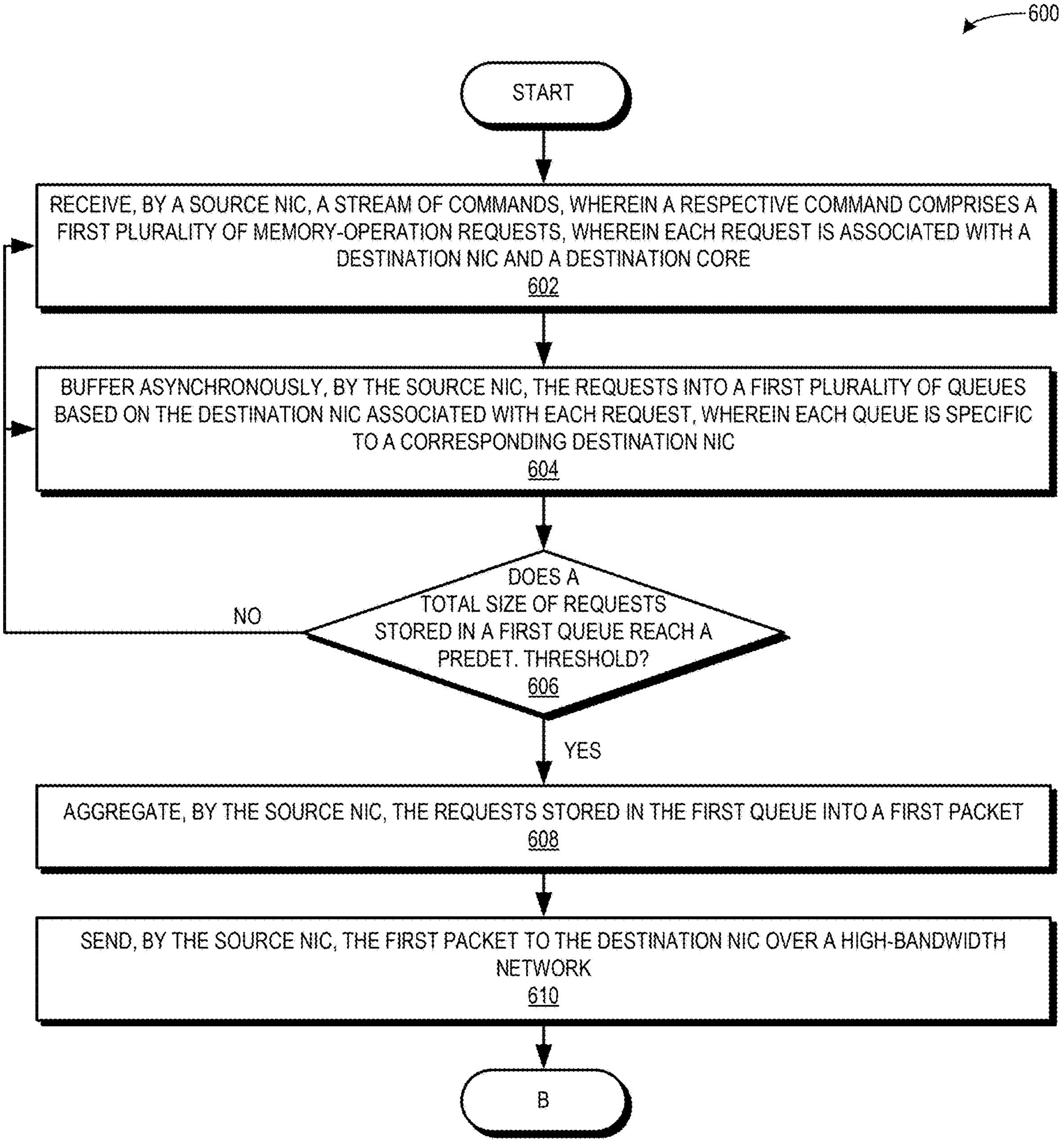
FIG. 6A presents a flowchart illustrating a method which facilitates aggregating remote memory-operation requests, including send operations by a source NIC, in accordance with an aspect of the present application.

The described aspects can also include a system which includes two NICs: a first NIC (e.g., a source NIC or a sending NIC); and a second NIC (e.g., a destination NIC or a receiving NIC), as depicted below in relation to FIGS. 6A and 6B. FIG. 6A presents a flowchart 600 illustrating a method which facilitates aggregating remote memory-operation requests, including send operations by a source NIC, in accordance with an aspect of the present application. During operation, the system receives, by a source network interface card (NIC), a stream of commands, wherein a respective command comprises a first plurality of memory-operation requests, wherein each request is associated with a destination NIC and a destination core (operation 602). The system buffers asynchronously the requests into a first plurality of queues based on the destination NIC associated with each request, wherein each queue is specific to a corresponding destination NIC (operation 604). If a total size of requests stored in a first queue does not reach a predetermined threshold (decision 606), the system can continue at operation 602 or 604.

If a total size of requests stored in a first queue does reach a predetermined threshold (decision 606), the system aggregates the requests stored in the first queue into a first packet (operation 608) and sends the first packet to the destination NIC over the high-bandwidth network, thereby reducing overhead associated with transmitting a large number of memory-operation requests over the high-bandwidth network (operation 610). The operation continues at Label B of FIG. 6B.

Figure 6B:
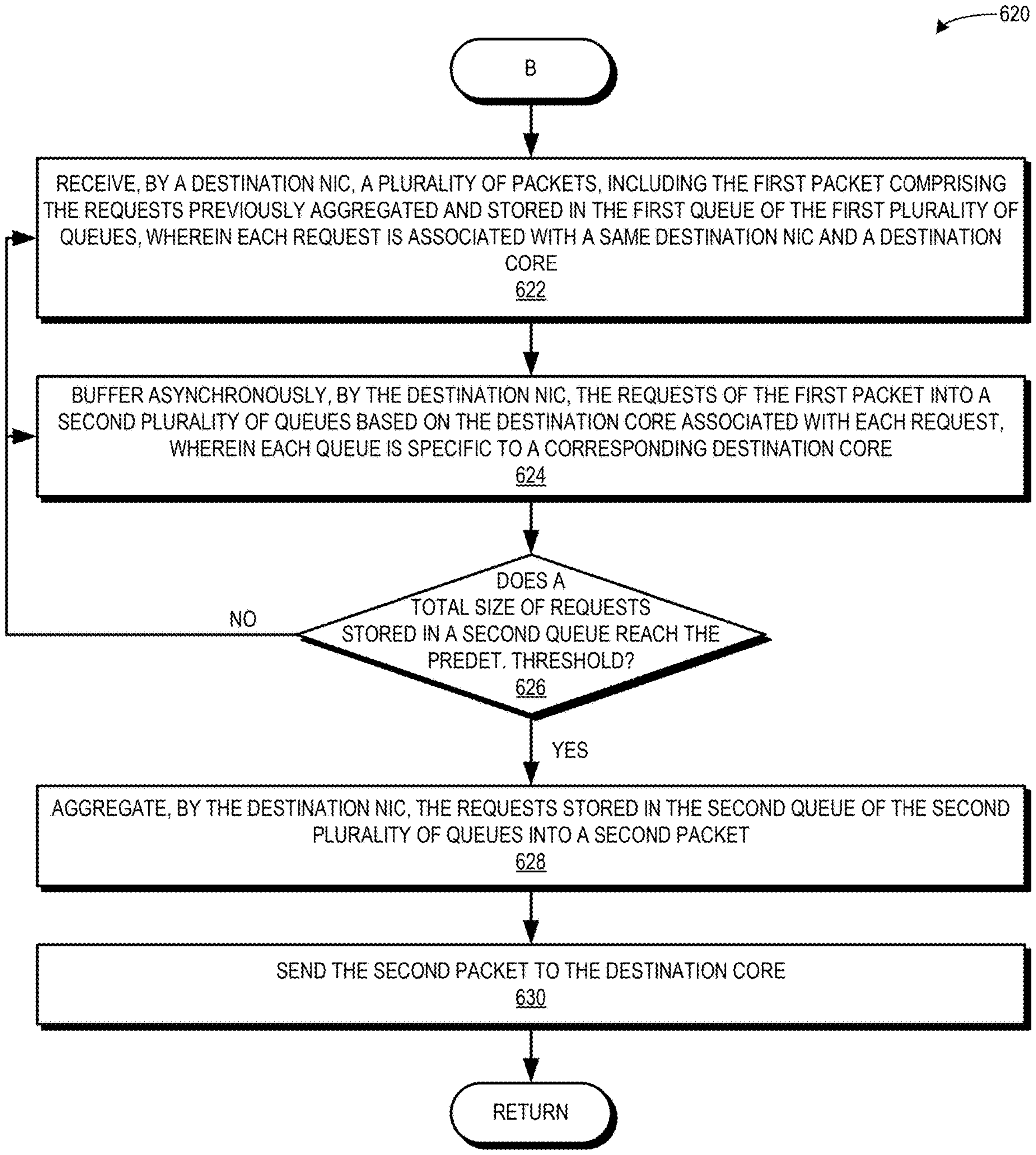
FIG. 6B presents a flowchart illustrating a method which facilitates aggregating remote memory-operation requests, including receive operations by a destination NIC, in accordance with an aspect of the present application.

FIG. 6B presents a flowchart 620 illustrating a method which facilitates aggregating remote memory-operation requests, including receive operations by a destination NIC, in accordance with an aspect of the present application. The system receives, by a destination NIC, a plurality of packets, including the first packet comprising the requests previously aggregated and stored in the first queue of the first plurality of queues, wherein each request is associated with a same destination NIC and a destination core (operation 622). The system, by the destination NIC, buffers asynchronously the requests of the first packet into a second plurality of queues based on the destination core associated with each request, wherein each queue is specific to a corresponding destination core (operation 624). If a total size of the requests stored in a second queue of the second plurality of queues does not reach the predetermined threshold (decision 626), the system can continue at operation 622 or 624.

If a total size of the requests stored in a second queue of the second plurality of queues does not reach the predetermined threshold (decision 626), the system, by the destination NIC, aggregates the requests stored in the second queue into a second packet (operation 628) and sends the second packet to the destination core, thereby reducing overhead associated with transmitting a large number of memory-operation requests over the high-bandwidth network (operation 630). The operation returns.

Apparatus Which Facilitates Aggregating Remote Memory-Operation Requests

Figure 7:
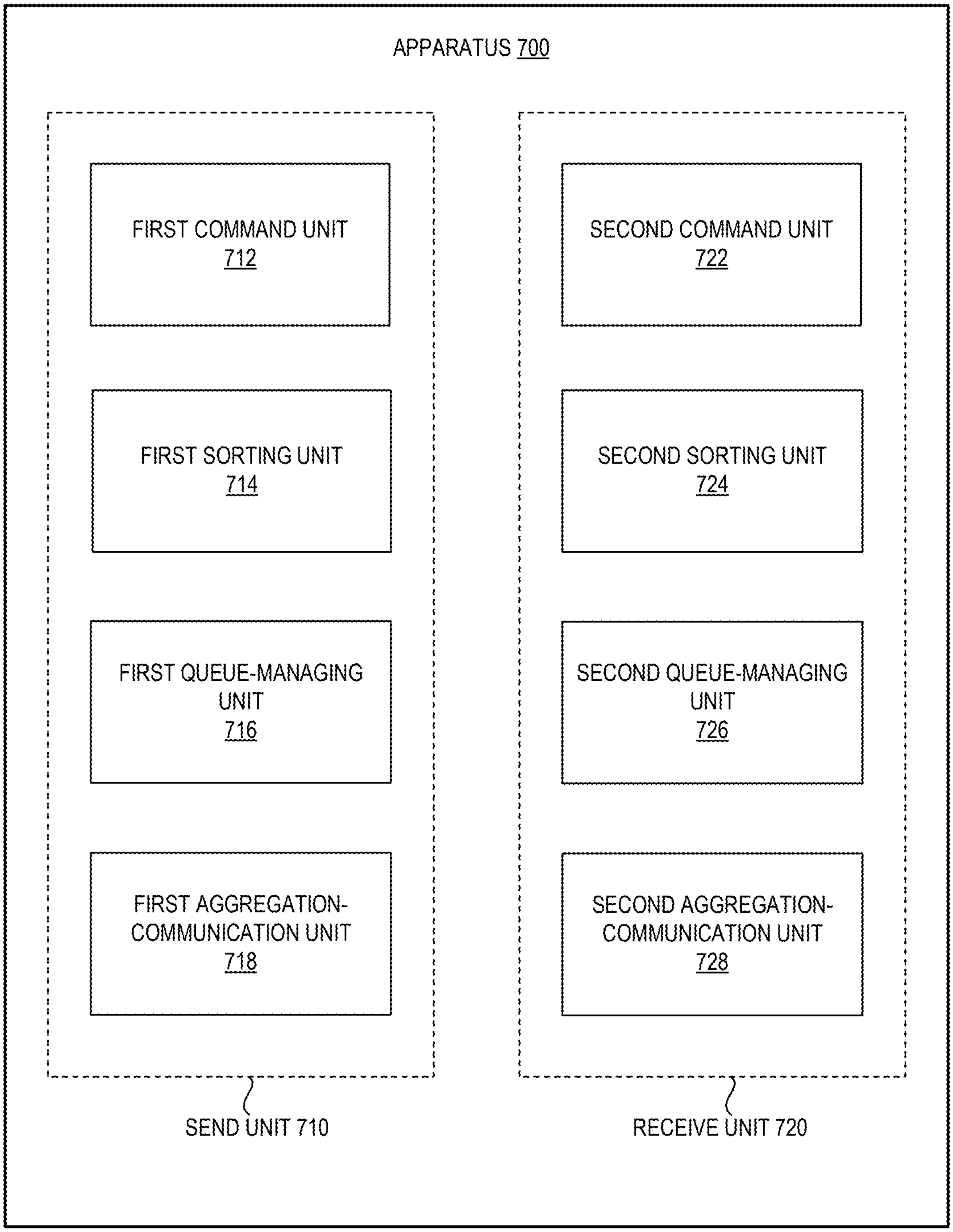
FIG. 7 illustrates an apparatus which facilitates aggregating remote memory-operation requests, in accordance with an aspect of the present application.

FIG. 7 illustrates an apparatus 700 which facilitates aggregating remote memory-operation requests, in accordance with an aspect of the present application. Apparatus 700 can represent a network interface card (NIC) (such as the single NIC described in relation to flowcharts 500 and 520 of FIGS. 5A and 5B) and can include a send unit 710 and a receive unit 720. Send unit 710 can include: a first command unit 712 (which can perform operations similar to those described above in relation to data-receiving units 122 and 322 of, respectively, FIGS. 1 and 3); a first sorting unit 714 (which can perform operations similar to those described above in relation to request-sorting unit 124 and sorting engines 330 of, respectively, FIGS. 1 and 3); a first queue-managing unit 716 (which can manage and buffer data in queues 126-132 of FIG. 1 and in per destination-NIC queues 340 of FIG. 3); and a first aggregation-communication unit 718 (which can perform operations similar to those described above for data-sending unit 134 of FIG. 1 and request-aggregating unit 350 and packet-sending unit 352 of FIG. 3).

Receive unit 720 can include: a second command unit 722 (which can perform operations similar to those described above in relation to data-receiving units 154 and 452 of, respectively, FIGS. 1 and 4); a second sorting unit 724 (which can perform operations similar to those described above in relation to request-sorting unit 152 and sorting engines 440 of, respectively, FIGS. 1 and 4); a second queue-managing unit 726 (which can manage and buffer data in queues 144-150 of FIG. 1 and in per destination-core queues 430 of FIG. 4); and a second aggregation-communication unit 728 (which can perform operations similar to those described above for data-streaming unit 142 of FIG. 1 and request-aggregating unit 424 and packet-sending unit 422 of FIG. 4).

In general, the disclosed aspects provide a system, method, and apparatus which facilitates. In one aspect, the system receives, by a local network interface card (NIC), a stream of commands, wherein a respective command comprises a first plurality of memory-operation requests, wherein each request is associated with a remote destination NIC and a remote destination core. The system buffers asynchronously the requests into a first plurality of queues based on the destination NIC associated with each request, wherein each queue is specific to a corresponding remote destination NIC. Responsive to determining that a total size of the requests stored in a first queue reaches a predetermined threshold, the system aggregates the requests stored in the first queue into a first packet and sends the first packet to the remote destination NIC over a high-bandwidth network. The system receives, by the local NIC, a plurality of packets, wherein a second packet of the received packets comprises a second plurality of memory-operation requests, wherein each request is destined to the local NIC and associated with a local destination core. The system buffers asynchronously the requests of the second packet into a second plurality of queues based on the local destination core associated with each request, wherein each queue is specific to a corresponding local destination core. Responsive to determining that a total size of the requests stored in a second queue of the second plurality of queues reaches the predetermined threshold, the system aggregates the requests stored in the second queue into a third packet and sends the third packet to the local destination core.

In a variation on this aspect, a first plurality of engines of the local NIC buffers asynchronously the requests into the first plurality of queues, and the system selects, based on a load-balancing strategy, a first engine of the first plurality of engines to buffer asynchronously the requests from each command.

In a further variation on this aspect, a second plurality of engines of the local NIC buffers asynchronously the requests into the second plurality of queues, and the system selects, based on a load-balancing strategy, a second engine of the second plurality of engines to buffer asynchronously the requests from each packet.

In a further variation, the stream of commands is received by the local NIC as a stream of commands and not as individual memory-operation requests.

In a further variation, the local NIC receives the stream of commands by retrieving data in contiguous arrays of memory-operation requests comprising payloads and corresponding destination information over a Peripheral Component Interconnect Express (PCIe) connection.

In a further variation, the system determines that a total size of aggregated requests stored in one or more queues of the second plurality of queues reaches the predetermined threshold. The system streams, by the local NIC, the aggregated requests stored in the one or more queues of the second plurality of queues to a respective corresponding destination core specific to a respective queue.

In a further variation, a respective remote destination core corresponds to a destination endpoint of a plurality of destination endpoints associated with the remote destination NIC.

In a further variation, a respective memory-operation request is associated with a payload of a size smaller than a predetermined size.

In a further variation, each command received by the local NIC is of a size up to 256 bytes.

In a further variation, the first plurality of queues comprises 4096 queues, and the second plurality of queues comprises 256 queues.

In a further variation, the respective command indicates in a header that the memory-operation requests are to be buffered and aggregated asynchronously.

In another aspect, an apparatus or a NIC comprises: a first command module to receive a stream of commands, wherein a respective command comprises a first plurality of memory-operation requests, wherein each request is associated with a remote destination NIC and a remote destination core; a first sorting module to buffer asynchronously the requests into a first plurality of queues based on the remote destination NIC associated with each request, wherein each queue is specific to a corresponding remote destination NIC; a first aggregation-communication module to, responsive to determining that a total size of the requests stored in a first queue of the first plurality of queues reaches a predetermined threshold, aggregate the requests stored in the first queue into a first packet and send the first packet to the remote destination NIC over a high-bandwidth network; a second command module to receive a plurality of packets, wherein a second packet of the received packets comprises a second plurality of memory-operation requests, wherein each request is destined to the NIC and associated with a local destination core; a second sorting module to buffer asynchronously the requests of the second packet into a second plurality of queues based on the local destination core associated with each request, wherein each queue is specific to a corresponding local destination core; and a second aggregation-communication module to, responsive to determining that a total size of the requests stored in a second queue of the second plurality of queues reaches the predetermined threshold, aggregate the requests stored in the second queue into a third packet and send the third packet to the local destination core.

In yet another aspect, a system comprises a local NIC (e.g., a source NIC) and a remote NIC (e.g., a destination NIC). The local NIC comprises: a first command module to receive a stream of commands, wherein a respective command comprises a first plurality of memory-operation requests, wherein each request is associated with a remote destination NIC and a remote destination core; a first sorting module to buffer asynchronously the requests into a first plurality of queues based on the destination NIC associated with each request, wherein each queue is specific to a corresponding remote destination NIC; and a first aggregation-communication module to, responsive to determining that a total size of the requests stored in a first queue of the first plurality of queues reaches a predetermined threshold, aggregate the requests stored in the first queue into a first packet and send the first packet to the remote destination NIC over a high-bandwidth network. The remote NIC comprises: a second command module to receive the first packet comprising the requests previously aggregated and stored in the first queue, wherein each request is destined to the remote NIC and associated with a remote destination core; a second sorting module to buffer asynchronously the requests of the first packet into a second plurality of queues based on the remote destination core associated with each request, wherein each queue is specific to a corresponding remote destination core; and a second aggregation-communication module to, responsive to determining that a total size of the requests stored in a second queue of the second plurality of queues reaches the predetermined threshold, aggregate the requests stored in the second queue into a second packet and send the second packet to the remote destination core.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method comprising:

receiving, by a source network interface card (NIC) from a plurality of source cores, a stream of commands, a respective command comprising a first plurality of memory-operation requests;

buffering asynchronously the memory-operation requests into a first queue of a first plurality of queues based on a destination NIC associated with each request, each queue of the first plurality of queues corresponding to a respective destination NIC, and wherein a number of the first plurality of queues is based on a number of destination NICs with which the source NIC is capable of communicating;

determining that a total size of the memory-operation requests in the first queue reaches a first predetermined threshold; and responsive to determining that the total size of the memory-operation requests in the first queue reaches the first predetermined threshold, aggregating the requests in the first queue into a first packet destined for the destination NIC.

2. The method of claim 1, further comprising:

selecting, by the source NIC based on a first load balancing strategy, a first engine from a first plurality of engines; and buffering asynchronously, by the selected first engine of the source NIC, the memory-operation requests of the first packet into the per-destination NIC queues.

3. The method of claim 1, wherein a size of the first packet is equal to a size of the first queue.

4. The method of claim 1, wherein the respective command comprises, for a respective memory-operation request, a header and a payload, and wherein the header indicates one or more of:

the destination NIC associated with the respective memory-operation request;

a destination core associated with the respective memory-operation request; or a size of the payload.

5. The method of claim 1, wherein a respective memory-operation request is contained in a single command.

6. The method of claim 1, wherein receiving the stream of commands comprises retrieving data in contiguous arrays of memory-operation requests comprising payloads and corresponding destination information over at least one of:

a Peripheral Component Interconnect Express (PCle) connection;

a Compute Express Link (CXL);

a host interface; or an on-chip network.

7. A computer-implemented method, comprising:

receiving, by a destination NIC from a source NIC, a plurality of packets, wherein a first packet comprises memory-operation requests previously aggregated and stored in a first queue of a first plurality of queues, each queue of the first plurality of queues corresponding to a respective destination NIC, and each respective packet of the received plurality of packets associated with a common destination NIC and a destination core;

buffering asynchronously, by the destination NIC, the memory-operation requests of the first packet into a second plurality of queues based on a destination core associated with each request, the second plurality of queues comprising per-destination core queues, and wherein a number of the second plurality of queues is based on a number of destination cores;

determining, by the destination NIC, that a total size of the memory-operation requests in a second queue of the second plurality of queues reaches a second predetermined threshold; and responsive to determining that the total size of the memory-operation requests in the second queue reaches the second predetermined threshold, aggregating the requests in the second queue into a second packet destined for the destination core.

8. The method of claim 7, further comprising:

selecting, by the destination NIC based on a second load balancing strategy, a second engine from a second plurality of engines; and buffering asynchronously, by the selected second engine of the destination NIC, the memory-operation requests of the second packet into the per-destination core queues.

9. The method of claim 7, wherein a size of the second packet is equal to a size of the second queue.

10. The method of claim 7, wherein the first plurality of queues comprises a greater number of queues than the second plurality of queues.

11. A system comprising a source network interface card (NIC) and a destination network interface card (NIC), the source NIC comprising first integrated circuits to:

receive, from a plurality of source cores, a stream of commands, a respective command comprising a first plurality of memory-operation requests;

buffer asynchronously the memory-operation requests into a first queue of a first plurality of queues based on a destination NIC associated with each request, each queue of the first plurality of queues corresponding to a respective destination NIC, and wherein a number of the first plurality of queues is based on a number of destination NICs with which the source NIC is capable of communicating;

determine whether a total size of the memory-operation requests in the first queue reaches a first predetermined threshold; and responsive to determining that the total size of the memory-operation requests in the first queue reaches the first predetermined threshold, aggregate the requests in the first queue into a first packet destined for the destination NIC.

12. The system of claim 11, the first integrated circuits of the source NIC further to:

select, based on a first load balancing strategy, a first engine from a first plurality of engines; and buffer asynchronously, by the selected first engine, the memory-operation requests of the first packet into the per-destination NIC queues.

13. The system of claim 11, wherein a size of the first packet is equal to a size of the first queue.

14. The system of claim 11, wherein the respective command comprises, for a respective memory-operation request, a header and a payload, and wherein the header indicates one or more of:

the destination NIC associated with the respective memory-operation request;

a destination core associated with the respective memory-operation request; or a size of the payload.

15. The system of claim 11, wherein a respective memory-operation request is contained in a single command.

16. The system of claim 11, the instructions of the first integrated circuits of the source NIC to receive the commands are further to:

receive the stream of commands by retrieving data in contiguous arrays of memory-operation requests comprising payloads and corresponding destination information over at least one of:

a Peripheral Component Interconnect Express (PCIe) connection;

a Compute Express Link (CXL);

a host interface; or an on-chip network.

17. The system of claim 11, the destination NIC comprising second integrated circuits to:

receive a plurality of packets, including the first packet comprising the requests previously aggregated and stored in the first queue, each respective packet of the received plurality of packets associated with a common destination NIC and a destination core;

buffer asynchronously the memory-operation requests of the first packet into a second plurality of queues based on a destination core associated with each request, the second plurality of queues comprising per-destination core queues;

determine whether a total size of the memory-operation requests in a second queue of the second plurality of queues reaches a second predetermined threshold; and responsive to determining that the total size of the memory-operation requests in the second queue reaches the second predetermined threshold, aggregate the requests in the second queue into a second packet destined for the destination core.

18. The system of claim 17, the second integrated circuits of the destination NIC further to:

select, based on a second load balancing strategy, a second engine from a second plurality of engines; and buffer asynchronously, by the selected second engine, the memory-operation requests of the second packet into the per-destination core queues.

19. The system of claim 17, wherein a size of the second packet is equal to a size of the second queue.

20. The system of claim 17, wherein the first plurality of queues comprises a greater number of queues than the second plurality of queues.

* * * * *